United States Patent
Liang et al.

(10) Patent No.: US 12,540,869 B2
(45) Date of Patent: Feb. 3, 2026

(54) PRESSURE SENSOR AND METHOD FOR MANUFACTURING SAME, AND ELECTRONIC DEVICE

(71) Applicants: Beijing BOE Technology Development Co., Ltd., Beijing (CN); BOE Technology Group Co., Ltd., Beijing (CN)

(72) Inventors: Kui Liang, Beijing (CN); Yurong He, Beijing (CN); Yingzi Wang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 294 days.

(21) Appl. No.: 18/556,307

(22) PCT Filed: Nov. 15, 2022

(86) PCT No.: PCT/CN2022/132076
§ 371 (c)(1),
(2) Date: Oct. 19, 2023

(87) PCT Pub. No.: WO2024/103263
PCT Pub. Date: May 23, 2024

(65) Prior Publication Data
US 2025/0085175 A1    Mar. 13, 2025

(51) Int. Cl.
*G01L 1/14* (2006.01)
*B81B 3/00* (2006.01)
(Continued)

(52) U.S. Cl.
CPC ............ *G01L 1/142* (2013.01); *B81B 3/0078* (2013.01); *B81C 1/00682* (2013.01);
(Continued)

(58) Field of Classification Search
CPC ......... G01L 1/2293; G01L 5/00; G01L 1/005; G01L 9/0005; G01L 9/0073; G01L 1/14;
(Continued)

(56) References Cited

U.S. PATENT DOCUMENTS

| | | |
|---|---|---|
| 2002/0093038 A1 | 7/2002 | Ikeda et al. |
| 2015/0008543 A1 | 1/2015 | Hong |

(Continued)

FOREIGN PATENT DOCUMENTS

| | | |
|---|---|---|
| CN | 1247386 A | 3/2000 |
| CN | 104280161 A | 1/2015 |

(Continued)

*Primary Examiner* — Brandi N Hopkins
(74) *Attorney, Agent, or Firm* — IPro, PLLC

(57) ABSTRACT

Provided is a pressure sensor. The pressure sensor has a sensing region and a non-sensing region, and includes: a first flexible film layer, wherein a first groove is disposed in a first surface of the first flexible film layer, and the first groove is within the sensing region; a first electrode layer; a first insulative layer, disposed on a side, distal from the first flexible film layer, of the first electrode layer; a second electrode layer, wherein the second electrode layer is disposed on a side, distal from the first flexible film layer, of the first insulative layer; and a second flexible film layer, wherein the second flexible film layer is disposed on a side, distal from the first flexible film layer, of the second electrode layer.

20 Claims, 10 Drawing Sheets

(51) Int. Cl.
 *B81C 1/00* (2006.01)
 *G01L 9/00* (2006.01)
 *G01L 9/12* (2006.01)

(52) U.S. Cl.
 CPC ............... *B81B 2201/0264* (2013.01); *B81B 2203/0127* (2013.01); *B81B 2203/019* (2013.01); *B81B 2203/0315* (2013.01); *B81B 2203/04* (2013.01); *B81C 2201/0108* (2013.01)

(58) Field of Classification Search
 CPC ... G01L 1/18; G01L 9/00; G01L 1/142; B81B 3/00; B81B 3/0078; B81B 2201/0264; B81B 2203/0127; B81B 2203/019; B81B 2203/0315; B81B 2203/04; B81C 1/00166; B81C 1/00; B81C 1/00682; B81C 2201/0108; H10K 50/84; B32B 5/02; B32B 5/26; B32B 27/00; B32B 27/06; B32B 27/12; B32B 33/00; B32B 38/00; B32B 38/14; H01C 17/02; H01C 17/065; H01C 17/28; A61B 5/00; A61B 5/0215
 See application file for complete search history.

(56) References Cited

U.S. PATENT DOCUMENTS

| | | | |
|---|---|---|---|
| 2016/0236932 | A1* | 8/2016 | Chau ..................... G01L 9/0052 |
| 2016/0377497 | A1 | 12/2016 | Nackaerts et al. |
| 2020/0200631 | A1* | 6/2020 | Friedrich ................ G01L 1/148 |
| 2020/0397321 | A1 | 12/2020 | Dirksen et al. |
| 2021/0405802 | A1 | 12/2021 | Guo |

FOREIGN PATENT DOCUMENTS

| | | | | |
|---|---|---|---|---|
| CN | 108803930 | A | | 11/2018 |
| CN | 109387348 | A | | 2/2019 |
| CN | 111787850 | A | | 10/2020 |
| CN | 113340480 | A | | 9/2021 |
| CN | 114777967 | A | | 7/2022 |
| CN | 117782377 | A | | 3/2024 |
| KR | 20190132259 | A | * 11/2019 | ........... G06F 3/0412 |

\* cited by examiner

PRESSURE SENSOR AND METHOD FOR MANUFACTURING SAME, AND ELECTRONIC DEVICE

CROSS-REFERENCE TO RELATED APPLICATION

This application is a U.S. national phase application based on PCT/CN2022/132076, filed on Nov. 15, 2022, the disclosure of which is incorporated herein by reference in its entirety.

TECHNICAL FIELD

The present disclosure related the field of sensor, and in particular to a pressure sensor and a method for manufacturing the same, and an electronic device.

BACKGROUND

Pressure sensors, as a component of micro-electro-mechanical systems (MEMS), are increasingly widely applied in automotive, aerospace, display, and biomedical fields.

SUMMARY

Embodiments of the present disclosure provide a pressure sensor and a method for manufacturing the same, and an electronic device. The technical solutions are described as follows.

According to some embodiments of the present disclosure, a pressure sensor is provided. The pressure sensor has a sensing region and a non-sensing region, the pressure sensor including:
 a first flexible film layer, wherein a first groove is disposed in a first surface of the first flexible film layer, and the first groove is within the sensing region;
 a first electrode layer, wherein the first electrode layer is disposed on the first surface of the first flexible film layer, and the first electrode layer at least includes a first electrode and a first electrode lead connected to the first electrode, wherein the first electrode is disposed in the first groove within the sensing region, and the first electrode lead is within the non-sensing region;
 a first insulative layer, disposed on a side, distal from the first flexible film layer, of the first electrode layer, wherein the first insulative layer is within the non-sensing region and outside the sensing region;
 a second electrode layer, wherein the second electrode layer is disposed on a side, distal from the first flexible film layer, of the first insulative layer, and the second electrode layer at least include a second electrode and a second electrode lead connected to the second electrode, wherein the second electrode is within the sensing region, a cavity is defined between the second electrode and the first electrode, the cavity is formed at least based on the first groove, and the second electrode lead is within the non-sensing region; and
 a second flexible film layer, wherein the second flexible film layer is disposed on a side, distal from the first flexible film layer, of the second electrode layer.

In some embodiments, a second groove is disposed in a second surface, close to the first flexible film layer, of the second flexible film layer, the second groove is within the sensing region;
 wherein the second electrode is disposed in the second groove within the sensing region, the cavity between the second electrode and the first electrode is formed based on the first groove and the second groove.

In some embodiments, a plurality of through holes are disposed in the second electrode, and the second flexible film layer is within the plurality of through holes.

In some embodiments, a third groove and a convex structure are disposed on a third surface, distal from the first flexible film layer, of the second flexible film layer;
 an orthographic projection of the third groove on the first flexible film layer covers an orthographic projection of at least one of the through holes on the first flexible film layer; and
 an orthographic projection of the convex structure on the first flexible film layer is not overlapped with orthographic projections of the plurality of through holes on the first flexible film layer.

In some embodiments, a ratio of an area of orthographic projections of the plurality of through holes on the first flexible film layer to an area of an orthographic projection of the cavity on the first flexible film layer ranges from 25% to 70%.

In some embodiments, the pressure sensor further includes a second insulative layer and a third insulative layer; wherein
 the second insulative layer is disposed between the first flexible film layer and the first electrode layer, and the second insulative layer is within the non-sensing region and outside the sensing region; and
 the third insulative layer is disposed between the second flexible film layer and the second electrode layer, and the third insulative layer is within the non-sensing region and outside the sensing region.

In some embodiments, the first flexible film layer includes a first flexible substrate, a fourth insulative layer, and a second flexible substrate that are stacked sequentially;
 wherein the second flexible substrate is close to the first electrode layer relative to the first flexible substrate, and the first groove is disposed in a surface, distal from the first flexible substrate, of the second flexible substrate.

According to some embodiments of the present disclosure, a method for manufacturing a pressure sensor is provided. The pressure sensor has a sensing region and a non-sensing region, and the method includes:
 providing a first flexible film layer, wherein a first groove is disposed in a first surface of the first flexible film layer, and the first groove is within the sensing region;
 forming a first electrode layer on the first surface of the first flexible film layer, wherein the first electrode layer at least includes a first electrode and a first electrode lead connected to the first electrode, wherein the first electrode is disposed in the first groove within the sensing region, and the first electrode lead is within the non-sensing region;
 forming a first insulative layer on a side, distal from the first flexible film layer, of the first electrode layer, wherein the first insulative layer is within the non-sensing region and outside the sensing region;
 providing a second flexible film layer;
 forming a second electrode layer on a second surface of the second flexible film layer, wherein the second electrode layer at least includes a second electrode and a second electrode lead connected to the second electrode, wherein the second electrode is within the sensing region, and the second electrode lead is within the non-sensing region; and bonding the second electrode layer with the first electrode layer by a bonding process, wherein a cavity is defined between the second electrodes and the first electrodes upon bonding, and the cavity is formed at least based on the first groove.

In some embodiments, a second groove is disposed in the second surface of the second flexible film layer, and the second groove is within the sensing region; and forming the second electrode layer in the second surface of the second flexible film layer includes:

forming the second electrode of the second electrode layer in the second groove on the second surface and forming the second electrode lead of the second electrode layer outside the second groove on the second surface;

wherein a cavity between the second electrode and the first electrode is formed based on the first groove and the second groove.

According to some embodiments of the present disclosure, a method for manufacturing a pressure sensor is provided. The pressure sensor has a sensing region and a non-sensing region, and the method includes:

providing a first flexible film layer, wherein a first groove is disposed in a first surface of the first flexible film layer, and the first groove is within the sensing region;

forming a first electrode layer on the first surface of the first flexible film layer, wherein the first electrode layer at least includes a first electrode and a first electrode lead connected to the first electrode, the first electrode is disposed in the first groove within the sensing region, and the first electrode lead is within the non-sensing region;

forming a first insulative layer on a side, distal from the first flexible film layer, of the first electrode layer, wherein the first insulative layer is within the non-sensing region and outside the sensing region;

forming a sacrificial layer by filling in the first groove;

forming a second electrode layer on a side, distal from the first flexible film layer, of the sacrificial layer, wherein the second electrode layer at least includes a second electrode and a second electrode lead connected to the second electrode, wherein the second electrode is within the sensing region, and a plurality of through holes are disposed in the second electrode, and the second electrode lead is within the non-sensing region;

removing the sacrificial layer in the first groove through the plurality of through holes by an etching solution, and upon removal of the sacrificial layer, a cavity is defined between the second electrode and the first electrode, and the cavity is formed at least based on the first groove; and forming a second flexible film layer on a side, distal from the first flexible film layer, of the second electrode layer, wherein the second flexible film layer is within the plurality of through holes.

In some embodiments, a third groove and a convex structure are disposed on a third surface, distal from the first flexible film layer, of the second flexible film layer; wherein an orthographic projection of the third groove on the first flexible film layer covers an orthographic projection of at least one of the through holes on the first flexible film layer; and an orthographic projection of the convex structure on the first flexible film layer is not overlapped with orthographic projections of the plurality of through holes on the first flexible film layer.

In some embodiments, a ratio of an area of orthographic projections of the plurality of through holes on the first flexible film layer to an area of an orthographic projection of the cavity on the first flexible film layer ranges from 25% to 70%.

In some embodiments, the pressure sensor further includes a second insulative layer and a third insulative layer; wherein the second insulative layer is disposed between a first flexible film layer and the first electrode layer, and the second insulative layer is within the non-sensing region and outside the sensing region;

the third insulative layer is disposed between the second flexible film layer and the second electrode layer, and the third insulative layer is within the non-sensing region and outside the sensing region.

In some embodiments, providing the first flexible film layer includes:

sequentially forming a first flexible substrate, a fourth insulative layer and a second flexible substrate;

wherein the second flexible substrate is close to the first electrode layer relative to the first flexible substrate, and the first groove is disposed in a surface, distal from the first flexible substrate, of the second flexible substrate.

According to some embodiments of the present disclosure, an electronic device is provided. The electronic device includes a first detection circuit, a second detection circuit and the pressure sensor as described in the above embodiments; wherein the first detection circuit is connected to the first electrode lead and the second electrode lead of the pressure sensor to detect a capacitance between the first electrode connected to the first electrode lead and the second electrode connected to the second electrode lead; and the second detection circuit is connected to the first detection circuit to determine the pressure of an environment in which the pressure sensor is disposed based on the capacitance between the first electrode and the second electrode.

BRIEF DESCRIPTION OF DRAWINGS

In order to describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

DETAILED DESCRIPTION

In order to make the objects, technical solutions and advantages of the present disclosure clearer, embodiments of the present disclosure are described in further detail below in conjunction with the accompanying drawings.

Figure 1:
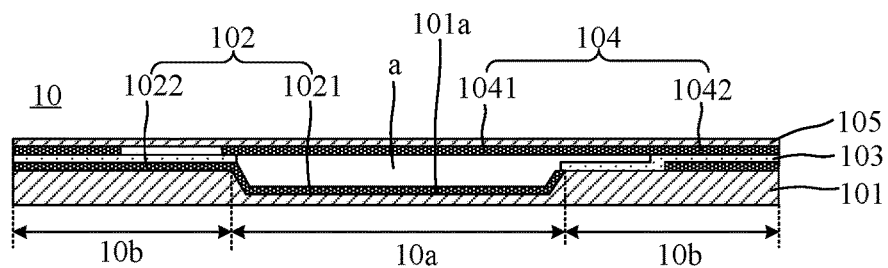
FIG. 1 is a schematic diagram of the structure of the pressure sensor according to some embodiments of the present disclosure.

FIG. 1 is a schematic diagram of the structure of the pressure sensor according to some embodiments of the present disclosure. Referring to FIG. 1, the pressure sensor 10 has a sensing region 10a and a non-sensing region 10b. The pressure sensor 10 includes a first flexible film layer 101, a first electrode layer 102, a first insulative layer 103, a second electrode layer 104, and a second flexible film layer 105 stacked sequentially, that is, the first electrode layer 102 is disposed on one side of the first flexible film layer 101, the first insulative layer 103 is disposed on the side, distal form the first flexible film layer 101, of the first electrode layer 102, the second electrode layer 104 is disposed on the side, distal form the first flexible film layer 101, of the first insulative layer 103, and the second flexible film layer 105 is disposed on the side, distal form the first flexible film layer 101, of the second electrode layer 104. The first insulative layer 103 disposed between the first electrode layer 102 and the second electrode layer 104 is configured to make the first electrode layer 102 and the second electrode layer 104 insulated.

A first groove 101a is disposed in the first surface of the first flexible film layer 101, the first groove 101a is within the sensing region 10a. Or it can be called that the sensing region 10a of the pressure sensor 10 is the region where the first groove 101a is disposed.

The first electrode layer 102 is disposed on the first surface of the first flexible film layer 101, and the first electrode layer 102 at least includes a first electrode 1021 and a first electrode lead 1022 connected to the first electrode 1021. The first electrode 1021 is disposed in the first groove 101a within the sensing region 10a, and the first electrode lead 1022 is disposed within the non-sensing region 10b, configured to lead out signals of the first electrode 1021 signals. The second electrode layer 104 at least includes a second electrode 1041 and a second electrode lead 1042 connected to the second electrode 1041. The second electrode 1041 is within the sensing region 10a, and the second electrode lead 1042 is within the non-sensing region 10b to lead out signals of the second electrode 1041. A cavity a is defined between the second electrode 1041 and the first electrode 1021. The cavity a is formed at least based on the first groove 101a. For example, in FIG. 1, because the first electrode 1021 is disposed in the first groove 101a, a gap is present between the surface of the first electrode 1021 close to the second electrode 1041 and the surface of the second electrode 1041 close to the first electrode 1021, and the gap is the cavity a between the second electrode 1041 and the first electrode 1021.

In addition, the first insulative layer 103 is within the non-sensing region 10b and outside the sensing region 10a. thereby avoiding the presence of the first insulative layer 103 in the cavity a, reducing the influence of the first insulative layer 103 (medium layer) to the electric field, and contributing to the linear variation of the capacitance between the first electrode 1021 and the second electrode 1041. Further, the detection sensitivity of the pressure sensor 10 is improved, and the complexity of the simulation test is reduced.

In summary, the embodiments of the present disclosure provide a pressure sensor. Because the better flexibility of the first flexible film layer and the second flexible film layer in the pressure sensor, the pressure sensor is more flexible and it is easy to apply the pressure sensor to a flexible product. Moreover, the flexible film layer is light, such that the risk of cavity collapse is reduced, the yield of the pressure sensor and the effect of pressure detection is ensured.

Figure 2:
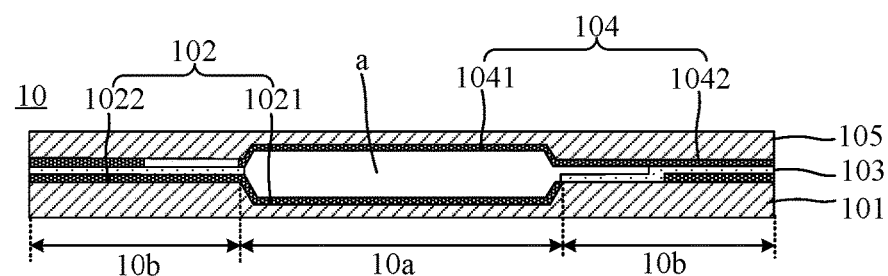
FIG. 2 is a schematic diagram of the structure of another pressure sensor according to some embodiments of the present disclosure.

FIG. 2 is a schematic diagram of the structure of another pressure sensor according to some embodiments of the present disclosure. Referring to FIG. 2, a second groove 105a is disposed in a second surface, close to the first flexible film layer 101, of the second flexible film layer 105, and the second groove 105a is within the sensing region 10a. That is, the position of the second groove 105a is opposite to the position of the first groove 101a. The second electrode 1041 is disposed in the second groove 105a within the sensing region 10a, and the cavity a between the second electrode 1041 and the first electrode 1021 is formed based on the first groove 101a and the second groove 105a.

The pressure sensor 10 shown in FIG. 2 has a larger cavity than the pressure sensor 10 shown in FIG. 1, and the pressure measurement range is larger.

Figure 3:
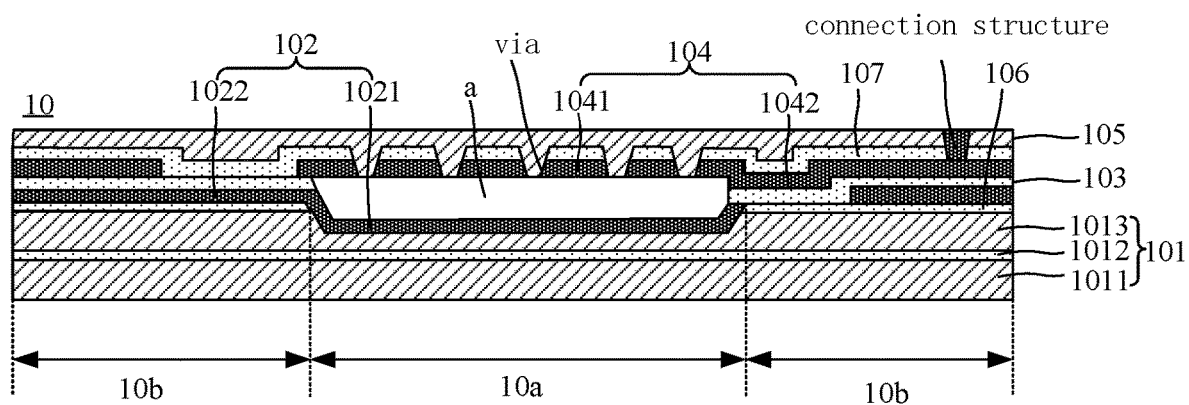
FIG. 3 is a schematic diagram of the structure of still another pressure sensor according to some embodiments of the present disclosure.
Figure 4:
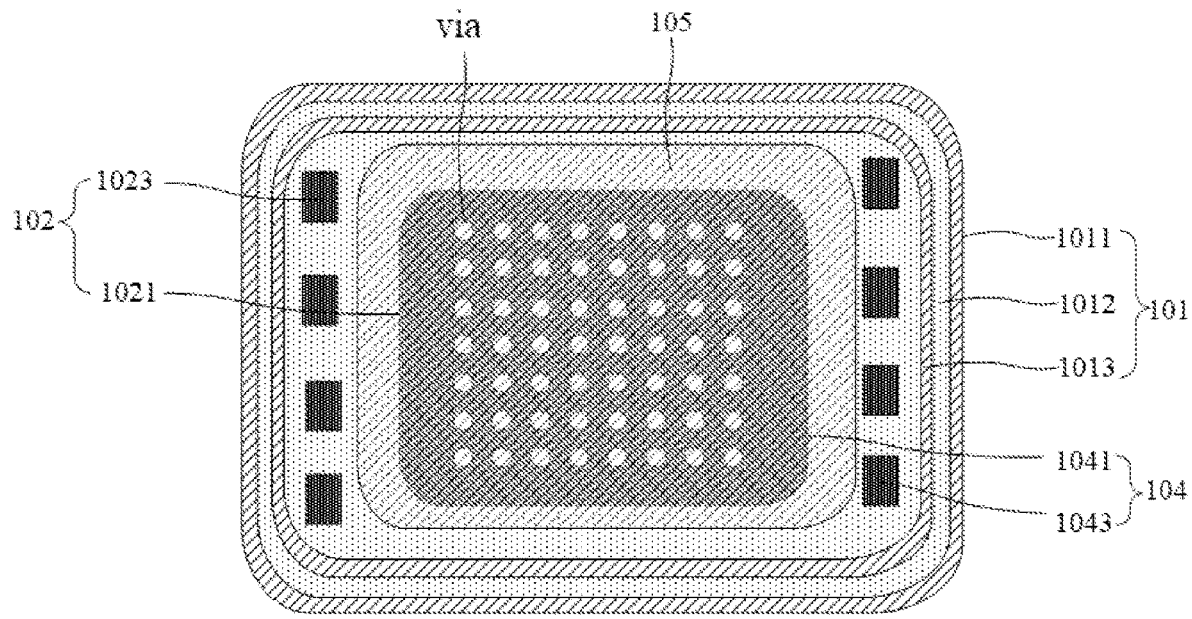
FIG. 4 is a top view of the pressure sensor shown in FIG. 3.

FIG. 3 is a schematic diagram of the structure of still another pressure sensor according to some embodiments of the present disclosure. FIG. 4 is a top view of the pressure sensor shown in FIG. 3. Referring to FIGS. 3 and 4, the second electrode 1041 has a plurality of through holes, and the second flexible film layer 105 is disposed within the plurality of through holes.

Figure 5:
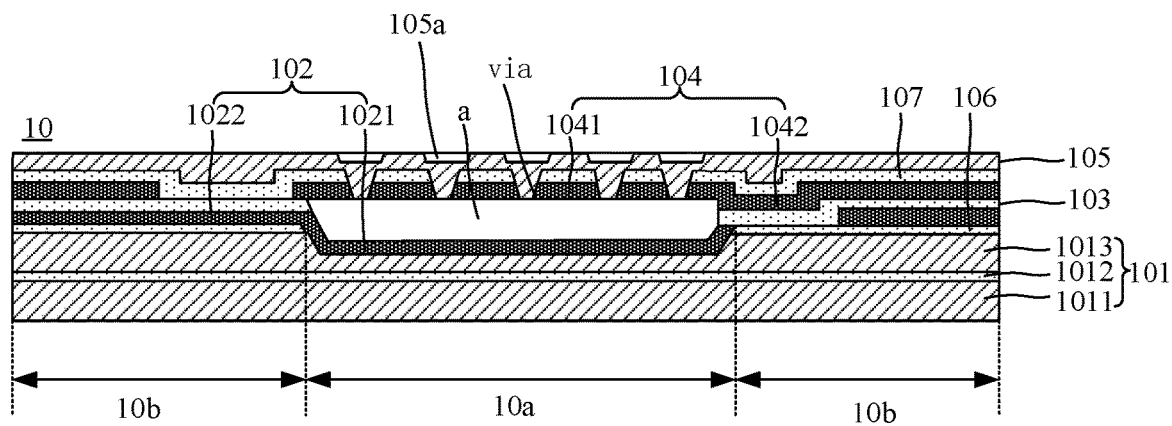
FIG. 5 is a schematic diagram of the structure of still another pressure sensor according to some embodiments of the present disclosure.
Figure 6:
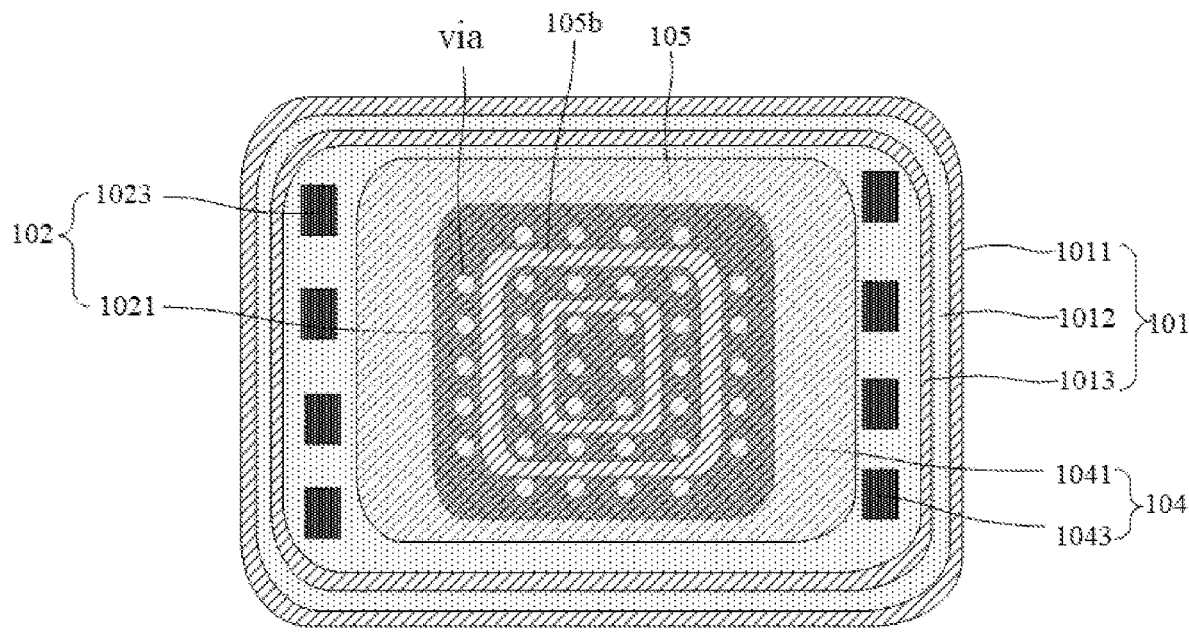
FIG. 6 is a top view of the pressure sensor shown in FIG. 5.

FIG. 5 is a schematic view of the structure of a further pressure sensor according to some embodiments of the present disclosure. FIG. 6 is a top view of the pressure sensor shown in FIG. 5. Referring to FIGS. 5 and 6, a third groove 105a and a convex structure 105b is disposed on a third surface, distal form the first flexible film layer 101, of the second flexible film layer 105.

An orthographic projection of the third groove 105a on the first flexible film layer 101 covers an orthographic projection of the at least one through hole on the first flexible film layer 101. The orthographic projection of the convex structure 105b on the first flexible film layer 101 is not overlapped with the orthographic projections of the plurality of through holes on the first flexible film layer 101. That is, the third surface of the second flexible film layer 105 opposite to the through holes is designed with the third groove 105a, and the third surface not opposite to the through holes is designed with the convex structure 105b.

It should be noted that the convex structure 105b is in formed on the surface of the second flexible film layer 105 due to the design of the third groove 105a. For example, the surface, distal form the first flexible film layer 101, of the convex structure 105b is co-planar with the surface, distal form the first flexible film layer 101, of the portion of the second flexible film layer 105 within the non-sensing region 10b.

In some embodiments, referring to FIG. 6, the shape of the convex structure 105b is an annular structure. Alternatively, the shape of the convex structure 105b is other shapes, which are not limited in the embodiments of the present disclosure.

Because a plurality of through holes are designed and the second flexible film layer 105 is within the plurality of through holes, the thickness of the second flexible film layer 105 within the through holes is larger than the thickness of the other regions. In order to ensure the uniformity of the thickness of the second flexible film layer 105 within the sensing region 10a as much as possible, a third groove 105a is designed in the third surface of the second flexible film layer 105 opposite to the through holes, and a convex structure 105b is designed in the third surface of the second flexible film layer 105 not opposite to the through holes. In this way, the second flexible film layer 105 adapts to the deformation better, and the influence of the residual stresses of the film layer itself generated in bending is reduced to have a better deformation. The degree of cavity deformation of the cavity a is reduced, which can also increase the degree of deformability and increase the range of pressure testing. Moreover, because of the design of the third groove 105a, the weight of the second flexible film layer 105 is reduced, further reducing the risk of collapse.

In the embodiments of the present disclosure, the ratio of the area of the orthographic projections of the plurality of through holes on the first flexible film layer 101 to the area of the orthographic projection of the cavity a on the first flexible film layer 101 ranges from 25% to 70%.

The main function of the plurality of through holes is to input an etching solution between the first electrode 1021 and the second electrode 1041 through the plurality of through holes, such that a sacrificial layer formed between the first electrode 1021 and the second electrode 1041 is etched. In the case that the etching of the sacrificial layer is completed, the cavity a is defined between the first electrode 1021 and the second electrode 1041.

In this way, in the case that the ratio of the area of the orthographic projections of the through holes on the first flexible film layer 101 to the area of the orthographic projection of the cavity a on the first flexible film layer 101 is too small, the sacrificial layer between the first electrode 1021 and the second electrode 1041 is not etched cleanly, resulting in the presence of the sacrificial layer residue in the cavity a, which affects the detection effect of the pressure sensor. In the case that the ratio of the area of the orthographic projections of the through holes on the first flexible film layer 101 to the area of the orthographic projection of the cavity a on the first flexible film layer 101 is too large, it results in poor support of the second flexible film layer 105, and the second electrode layer 104 on the second surface, close to the first flexible film layer 101, of the second flexible film layer 105 moves in a direction approaching the first electrode layer 102 (i.e., the cavity a collapses), and the yield of the pressure sensor is lower.

In some embodiments, the shape of the through hole designed on the second electrode 1041 is circular. Alternatively, the shape of the through hole is other shapes, such as rectangular or square, etc., and is not limited in the embodiments of the present disclosure. The distance between any two adjacent through holes is greater than 10 μm. In the case that the shape of the through hole is circular, the diameter of the through hole ranges from 0.3 μm (micrometers) to 3 μm.

Referring to FIG. 3, FIG. 5, FIG. 7, and FIG. 8, the pressure sensor 10 further includes a second insulative layer 106 and a third insulative layer 107. The second insulative layer 106 is disposed between the first flexible film layer 101 and the first electrode layer 102, and the second insulative layer 106 is within the non-sensing region 10b and outside the sensing region 10a. The third insulative layer 107 is disposed between the second flexible film layer 105 and the second electrode layer 104, and the third insulative layer 107 is within the non-sensing region 10b and outside the sensing region 10a.

In this way, the portion of the first flexible film layer 101 within the non-sensing region 10b is connected to the first electrode lead 1022 of the first electrode layer 102 through the first insulative layer 103, increasing the adhesion of the first electrode lead 1022 and improving the yield. Similarly, the portion of the second flexible film layer 105 within the non-sensing region 10b is connected to the second electrode lead 1042 of the second electrode layer 104 via the second insulative layer 106, increasing the adhesion of the second electrode lead 1042 and improving the yield rate.

Referring to FIG. 3, FIG. 5, FIG. 7, and FIG. 8, the first flexible film layer 101 includes a first flexible substrate 1011, a fourth insulative layer 1012, and a second flexible substrate 1013 stacked sequentially. That is, the first flexible film layer 101 has a triple stacked layer structure. The second flexible substrate 1013 is close to the first electrode layer 102 relative to the first flexible substrate 1011, the surface, distal form the first flexible substrate 1011, of the second flexible substrate 1013 is the first surface of the first flexible film layer 101, and the first groove 101a is disposed in the surface, distal form the first flexible substrate 1011, of the second flexible substrate 1013. Alternatively, the second flexible film layer 105 includes a third flexible substrate. That is, the second flexible film layer 105 is a one-layer structure.

In some embodiments, the thickness of the first flexible film layer 101 ranges from 10 μm to 200 μm. The thickness of the cavity a (i.e., the distance between the first electrode 1021 and the second electrode 1041) ranges from 500 nm (nanometers) to 3 μm. That is, the range of the thickness of the cavity a is larger, and the detection range of the pressure sensor 10 is increased.

Referring to FIG. 3, the second flexible film layer 105 and the third insulative layer 107 have a via therethrough, a connection structure on the side, distal form the first flexible film layer 101, of the second flexible film layer 105 is connected to the second electrode lead 1042 through the via. The connection structure is configured to realize signal transmission.

In the embodiments of the present disclosure, the materials of the first flexible substrate 1011 and the second flexible substrate 1013 in the first flexible film layer 101, and the third flexible substrate in the second flexible film layer 105, is flexible materials. For example, the material is polyimide (PI). Because PI is a mature material that has been widely used in flexible displays and the like, having a reliable trustworthiness, the service life of the pressure sensor and the trustworthiness can be ensured. Moreover, using PI as the main material of the first flexible film layer 101 and the second flexible film layer 105 has better strain properties compared to inorganic materials, which can increase the range and sensitivity of the pressure sensor and improve consistency.

In addition, the materials of the first insulative layer 103, the second insulative layer 106, the third insulative layer 107, and the fourth insulative layer 1012 are inorganic insulative materials, for example, silicon nitride (SiNx). The materials of the first electrode layer 102, the second electrode layer 104, and the connection structure are metallic materials, for example, copper (Cu), molybdenum-aluminum-molybdenum (Mo/Al/Mo), or gold (Au).

In some embodiments, the material of the second electrode layer 104 in the embodiments of the present disclosure is low temperature poly-silicon (LTPS), which can improve the resistance of the second electrode layer 104.

The structure of the pressure sensor 10 in the embodiments of the present disclosure is: a first flexible substrate 1011, a fourth insulative layer 1012 (silicon nitride, configured to isolate water and oxygen), a second flexible substrate 1013 (a first groove 101a), a second insulative layer 106 (silicon nitride, configured to increase the adherence of the first electrode layer 102), the first electrode layer 102, the first insulative layer 103 (silicon nitride, as a dielectric layer and configured to insulate the first electrode layer 102 from the second electrode layer 104), the second electrode layer 104, the third insulative layer 107 (silicon nitride, configured to support the second flexible film layer 105 and increase the adhesion of the second flexible film layer 105), the second flexible film layer 105 (for encapsulation), and the connection structure (for signal transmission).

The silicon nitride provides better framework support due to its higher modulus of rigidity. Further, the flexible film layer is less susceptible to gravity due to its low modulus of rigidity and density. That is, the embodiments of the present disclosure ensure the support strength while make the weight of the second flexible film layer 105 small, which is conducive to stabilizing the cavity structure and avoiding the collapse of the cavity a. Moreover, using the flexible film layer as the main body of the pressure sensor, the sensitivity and detection range of the pressure measurement is increased due to the better elasticity, vibration ability and vibration range of the flexible film layer. Other inorganic or organic dielectric layer is not present between the first electrode 1021 and the second electrode 1041, which can reduce the parasitic capacitance and increase the sensitivity.

Figure 7:
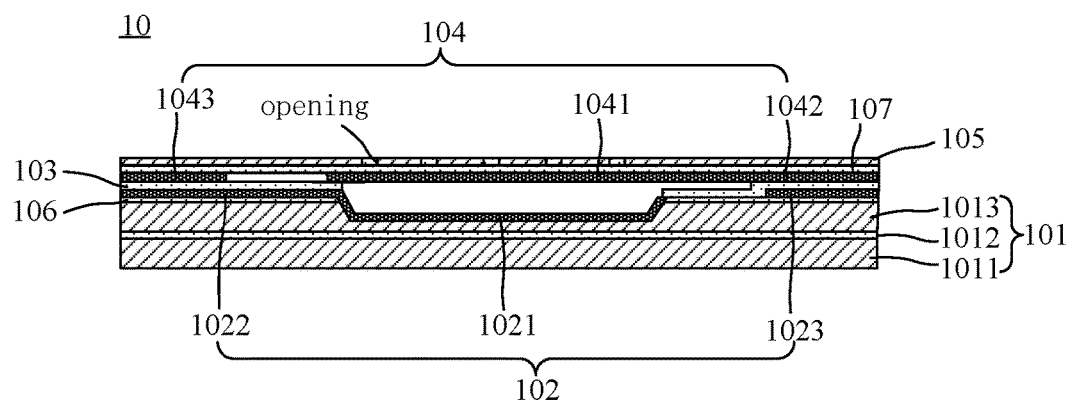
FIG. 7 is a schematic diagram of the structure of still another pressure sensor according to some embodiments of the present disclosure.
Figure 8:
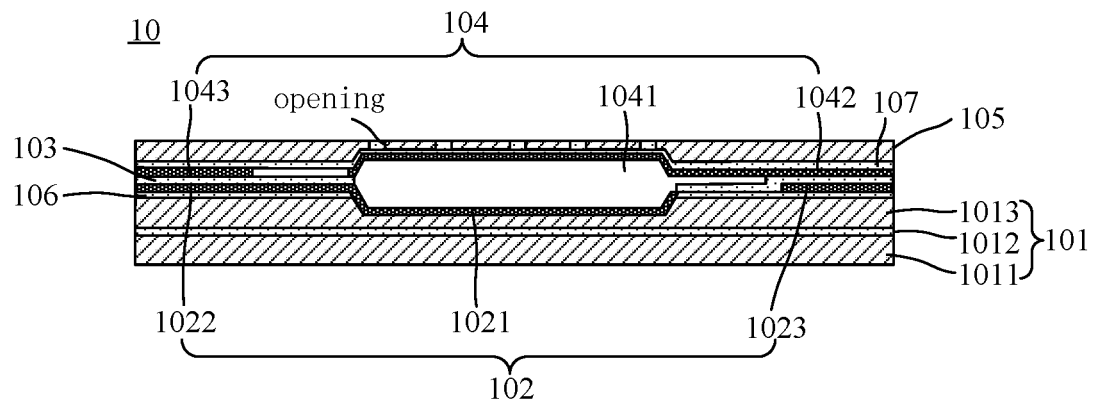
FIG. 8 is a schematic diagram of the structure of still another pressure sensor according to some embodiments of the present disclosure.

Referring to FIGS. 7 and 8, the first electrode layer 102 includes a first signal line 1023. The first signal line 1023 is within the non-sensing region 10b and a gap is disposed between the first electrode 1021 and the first electrode lead 1022. This first signal line 1023 is configured to transmit other signals (e.g., the first signal line 1023 is grounded). That is, the first signal line 1023, the first electrode 1021 and the first electrode lead 1022 is disposed in the same layer and manufactured by one composition process using the same material. The second electrode layer 104 includes a second signal line 1043. The second signal line 1043 is within the non-sensing region 10b and a gap is disposed between the second electrode 1041 and the second electrode lead 1042. The second signal line 1043 is configured to transmit other signals (e.g., the second signal line 1043 is a wire for conditioning signals or a metal wire for bonding). That is, the second signal line 1043, the second electrode 1041 and the second electrode lead 1042 is disposed in the same layer and manufactured by one composition process using the same material.

In the embodiments of the present disclosure, because the stiffness of the material of the flexible film layer is poorer than the stiffness of the material of the insulative layer, in order to improve the stiffness of the entire structure, referring to FIGS. 7 and 8, the second flexible film layer 105 has openings. The openings are filled with insulative material. It should be noted that in the case that the pressure sensor need have a certain degree of flexibility, it is unnecessary to design an opening in the second flexible film layer 105. The design of the opening is adjusted according to actual needs.

In summary, the embodiments of the present disclosure provide a pressure sensor. Because the better flexibility of the first flexible film layer and the second flexible film layer in the pressure sensor, the pressure sensor is more flexible and it is easy to apply the pressure sensor to a flexible product. Moreover, the flexible film layer is light, such that the risk of cavity collapse is reduced, the yield of the pressure sensor and the effect of pressure detection is ensured.

Figure 9:
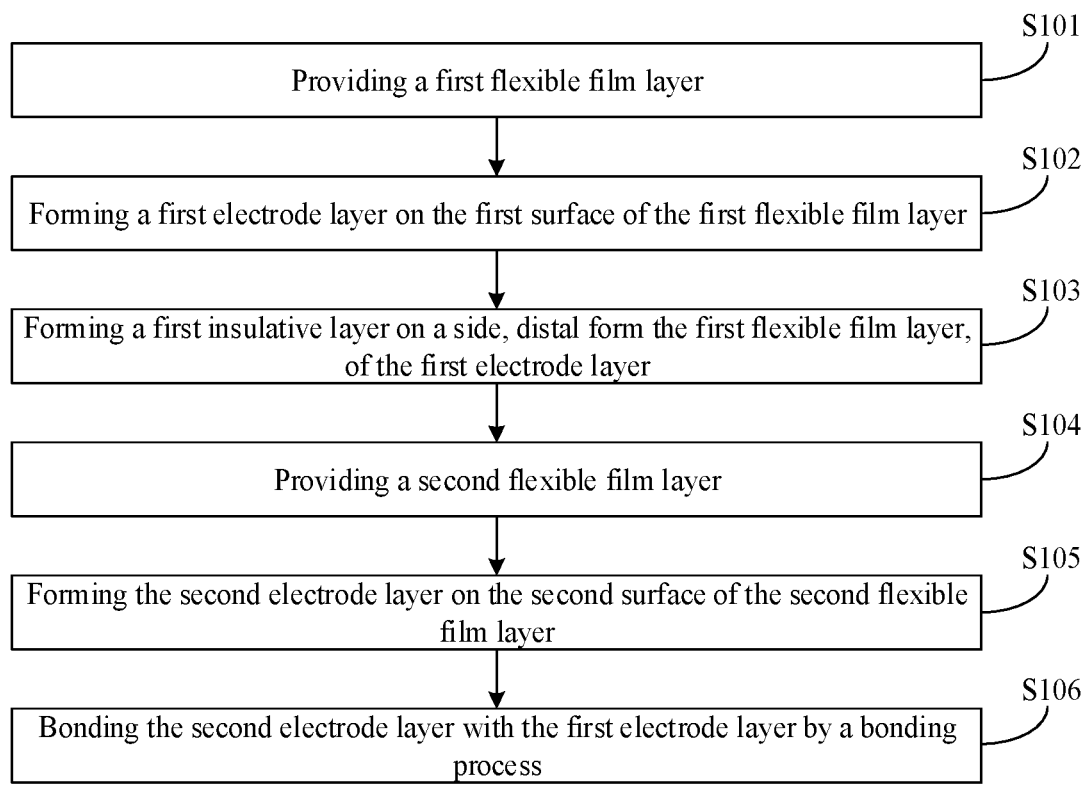
FIG. 9 is a flowchart of a method for manufacturing the pressure sensor according to some embodiments of the present disclosure.

FIG. 9 is a flowchart of a method for manufacturing a pressure sensor according to some embodiments of the present disclosure. Referring to FIG. 9, the method includes the following processes.

In S101, a first flexible film layer is provided.

In the embodiments of the present disclosure, the provided first flexible film layer 101 is disposed on the first glass substrate G1. A first groove 101a is disposed in a first surface of the first flexible film layer 101, the first groove 101a is within the sensing region 10a.

In S102, a first electrode layer is formed on the first surface of the first flexible film layer.

In the embodiments of the present disclosure, the first surface of the first flexible film layer 101 is a surface, distal form the first glass substrate G1, of the first flexible film layer 101. That is, a first electrode layer 102 is formed on the side, distal form the first glass substrate G1, of the first flexible film layer 101. The first electrode layer 102 at least includes a first electrode 1021 and a first electrode lead 1022 connected to the first electrode 1021. The first electrode 1021 is disposed in a first groove 101a within the sensing region 10a, and the first electrode lead 1022 is within a non-sensing region 10b.

In S103, a first insulative layer is formed on a side, distal form the first flexible film layer, of the first electrode layer.

The first insulative layer 103 is within the non-sensing region 10b and is outside the sensing region 10a. In this way, the first electrode lead 1022 in the first electrode layer 102 within the non-sensing region 10b is insulated from the subsequently bonded second electrode layer 104.

In S104, a second flexible film layer is provided.

The second flexible film layer 105 provided is disposed on the second glass substrate G2.

In S105, the second electrode layer is formed on the second surface of the second flexible film layer.

In the embodiments of the present disclosure, the second surface of the second flexible film layer 105 is a surface, distal form the second glass substrate G2, of the second flexible film layer 105. That is, a second electrode layer 104 is formed on the surface, distal form the second glass substrate G2, of the second flexible film layer 105. The second electrode layer 104 at least includes a second electrode 1041 and a second electrode lead 1042 connected to the second electrode 1041. The second electrode 1041 is within a sensing region 10a, and the second electrode lead 1042 is within a non-sensing region 10b.

In S106, the second electrode layer is bonded with the first electrode layer by a bonding process.

In the embodiments of the present disclosure, upon bonding, a cavity a is defined between the second electrode 1041 and the first electrode 1021, and the cavity a is formed at least based on the first groove 101a. It should be noted that the first glass substrate G1 and the second glass substrate G2 is peeled off to form the pressure sensor in the case that the bonding is completed.

In summary, embodiments of the present disclosure provide the method for manufacturing the pressure sensor. The first flexible film layer and the second flexible film layer in the pressure sensor acquired by the method are more flexible, and the pressure sensor is more flexible and it is easy to apply the pressure sensor to a flexible product. Moreover, the flexible film layer is light, such that the risk of cavity collapse is reduced, the yield of the pressure sensor and the effect of pressure detection is ensured.

Figure 10:
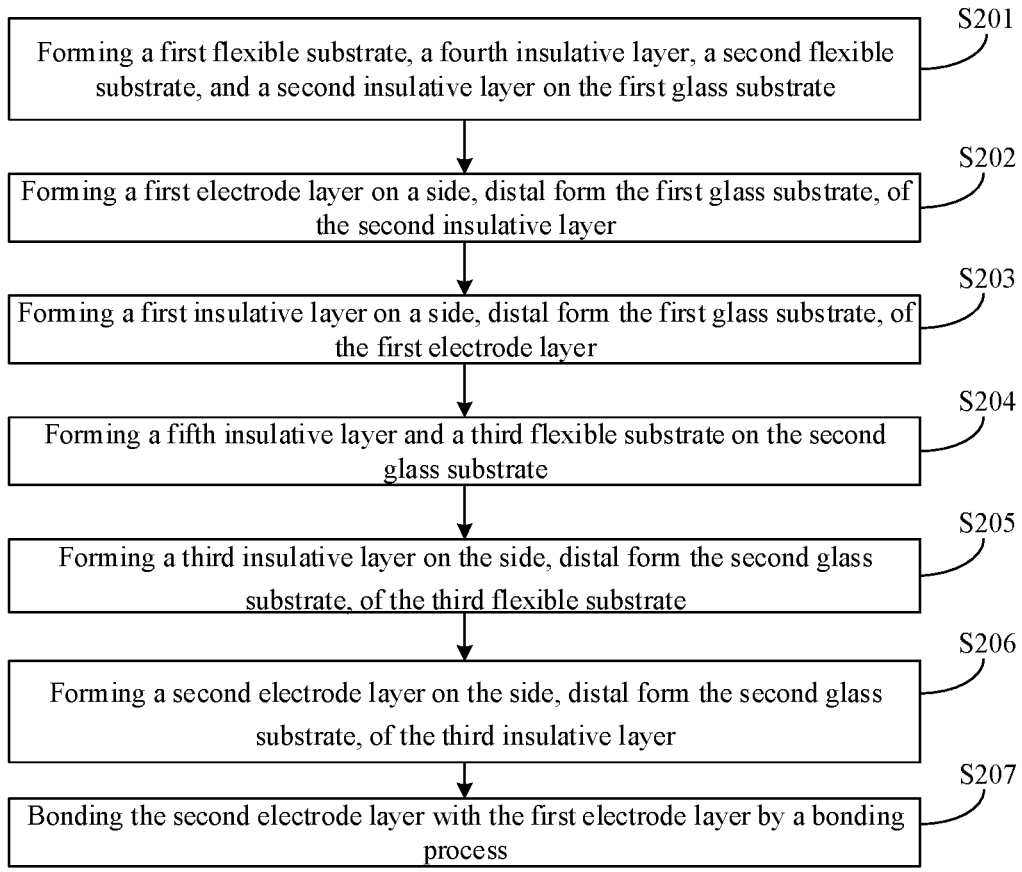
FIG. 10 is a flowchart of method for manufacturing still another pressure sensor according to some embodiments of the present disclosure.

FIG. 10 is a flowchart of another method for manufacturing a pressure sensor according to some embodiments of the present disclosure. Referring to FIG. 10, the method includes the following processes.

In S201, a first flexible substrate, a fourth insulative layer, a second flexible substrate, and a second insulative layer are formed on the first glass substrate G1.

Figure 11:
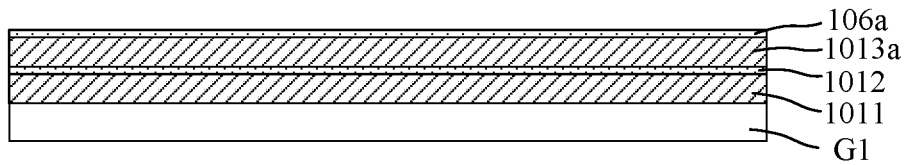
FIG. 11 is a schematic diagram of forming a first flexible substrate, a fourth insulative layer, a second flexible film and a second insulative film according to some embodiments of the present disclosure.
Figure 12:
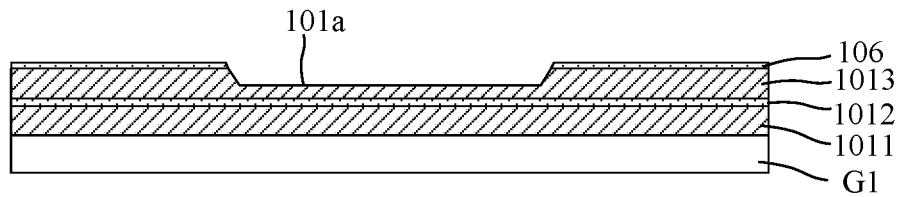
FIG. 12 is a schematic diagram of forming a second flexible substrate and a second insulative layer according to some embodiments of the present disclosure.

In some embodiments of the present disclosure, referring to FIGS. 11 and 12, the process of forming the first flexible substrate 1011, the fourth insulative layer 1012, the second flexible substrate 1013, and the second insulative layer 106 on the first glass substrate G1 includes acquiring a first glass substrate G1; forming a first flexible substrate 1011 on the first glass substrate G1; forming a fourth insulative layer 1012 on a side, distal from the first glass substrate G1, of the first flexible substrate 1011; forming a second flexible film 1013a on a side, distal from the first glass substrate G1, of the fourth insulative layer 1012; forming a second insulative film 106a on a side, distal form the first glass substrate G1, of the second flexible film 1013a; acquiring the second insulative layer 106 by patterning the second insulative film 106a and the second flexible film 1013a to etch the second insulative film 106a within the sensing region 10a, and acquiring the second flexible substrate 1013 by etching the second flexible film 1013a on a surface, distal form the first glass substrate G1, of the second flexible film 1013a to form the first groove 101a.

The process of patterning includes photoresist coating, exposure of the photoresist using a mask plate, developing, and etching.

In S202, a first electrode layer is formed on a side, distal form the first glass substrate, of the second insulative layer.

In the embodiments of the present disclosure, the forming process of the first electrode layer 102 includes forming a first electrode film on the side, distal form the first glass substrate G1, of the second insulative layer 106, and acquiring the first electrode layer 102 by patterning the first electrode film.

Figure 13:
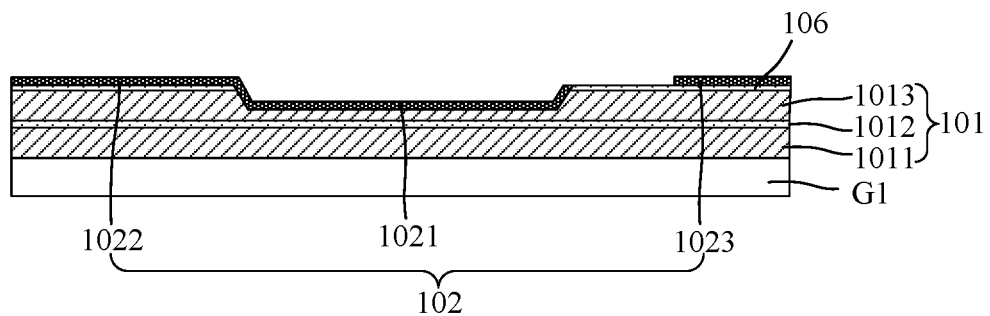
FIG. 13 is a schematic diagram of forming a first electrode layer according to some embodiments of the present disclosure.

Referring to FIG. 13, the first electrode layer 102 at least includes a first electrode 1021 and a first electrode lead 1022 connected to the first electrode 1021. The first electrode 1021 is disposed in a first groove 101a within the sensing region 10a, and the first electrode lead 1022 is within a non-sensing region 10b. The first electrode layer 102 further includes a first signal line 1023, configured to transmit other signals.

In S203, a first insulative layer is formed on a side, distal form the first glass substrate, of the first electrode layer.

Figure 14:
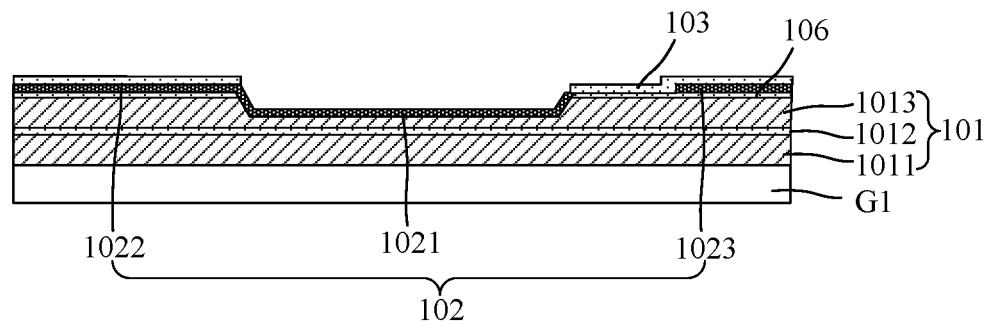
FIG. 14 is a schematic diagram of forming a first insulative layer according to some embodiments of the present disclosure.

The process of forming the first insulative layer 103 includes forming a first insulative film 103a on the side, distal form the first glass substrate G1, of the first electrode layer 102; and acquiring the first insulative layer 103 by patterning the first insulative film 103a. Referring to FIG. 14, the first insulative layer 103 is within the non-sensing region 10b and is outside the sensing region 10a. In this way, the first electrode lead 1022 of the electrode layer 102 within the non-sensing region 10b is insulated from the subsequently bonded second electrode layer 104.

In S204, a fifth insulative layer and a third flexible substrate is formed on the second glass substrate.

In the embodiments of the present disclosure, a glass substrate (the second glass substrate G2) is reacquired, and a fifth insulative layer 108 and a third flexible substrate 105 is formed on the reacquired second glass substrate G2. The fifth insulative layer 108 is configured to improve the adhesion of the third flexible substrate 105 on the second glass substrate G2.

Figure 15:
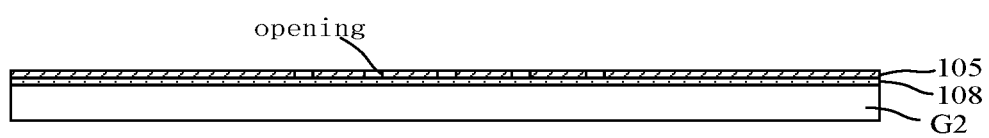
FIG. 15 is a schematic diagram of forming a fifth insulative layer and a third flexible substrate according to some embodiments of the present disclosure.

In some embodiments, referring to FIG. 15, the second groove 105a is not need to be disposed on the third flexible substrate 105, i.e., the surface, distal form the second glass substrate G2, of the third flexible substrate is planar, and the cavity a formed by the subsequent first electrodes 1021 and the second electrodes 1041 is formed based on the first groove 101a on the second flexible substrate 1013 only. Alternatively, referring to FIG. 16, a second groove 105a is designed on the third flexible substrate 105. In this way, the subsequently formed second electrode 1041 is disposed within the second groove 105a, and the cavity a formed by the first electrode 1021 and the second electrode 1041 is formed based on the first groove 101a and the second groove 105a.

In the case that, the second groove 105a is disposed on the third flexible substrate 105, the manufacturing process of the third flexible substrate 105 includes forming a third flexible film on the side, distal form the second glass substrate G2, of the fifth insulative layer 108; and acquiring the third flexible substrate by patterning the third flexible film.

Figure 16:
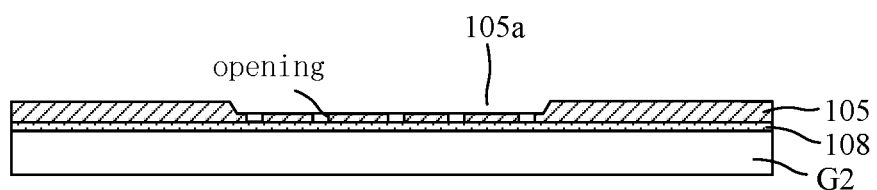
FIG. 16 is another schematic diagram of forming a fifth insulative layer and a third flexible substrate embodiment according to some embodiments of the present disclosure.

In the embodiments of the present disclosure, the portions of the third flexible substrate 105 in FIG. 15 and FIG. 16 are within the sensing region 10a are designed with openings. The openings are configured to fill subsequent insulative material to improve the rigidity of the entire structure.

In S205, a third insulative layer is formed on the side, distal form the second glass substrate, of the third flexible substrate.

In the embodiments of the present disclosure, the process of forming the third insulative layer 107 includes forming a third insulative film on one side, distal form the second glass substrate G2, of the third flexible substrate 105; and acquiring the third insulative layer 107 by patterning the third insulative film to etch the third insulative film disposed within the sensing region 10a.

In S206, a second electrode layer is formed on the side, distal form the second glass substrate, of the third insulative layer.

In the embodiments of the present disclosure, the process of forming the second electrode layer 104 includes forming a second electrode film on the side, distal form the second glass substrate G2, of the third insulative layer 107; and acquiring the second electrode layer 104 by patterning the second electrode film.

Figure 17:
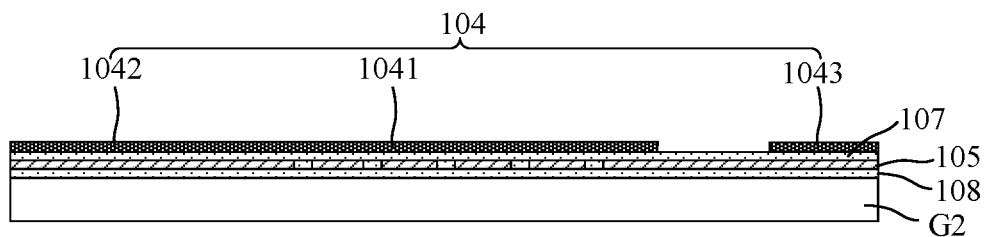
FIG. 17 is a schematic diagram of forming a second electrode layer according to some embodiments of the present disclosure.
Figure 18:
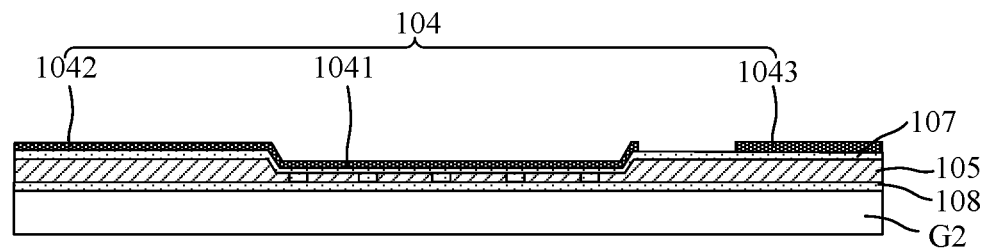
FIG. 18 is another schematic diagram of forming a second electrode layer according to some embodiments of the present disclosure.

Referring to FIG. 17, the second electrode layer 104 at least includes a second electrode 1041 and a second electrode lead 1042 connected to the second electrode 1041. The second electrode 1041 is within a sensing region 10a, and the first electrode lead 1022 is within a non-sensing region 10b. Referring to FIG. 18, in the case that a second groove 105a is disposed on the third flexible substrate 105, the second electrode 1041 is disposed in the second groove 105a.

Further, referring to FIGS. 17 and 18, the second electrode layer 104 further includes a second signal line 1043, a gap is disposed between the second signal line 1043 and the second electrode 1041, and the second signal line 1043 is configured to transmit other signals.

In S207, the second electrode layer is bonded with the first electrode layer by a bonding process.

Figure 19:
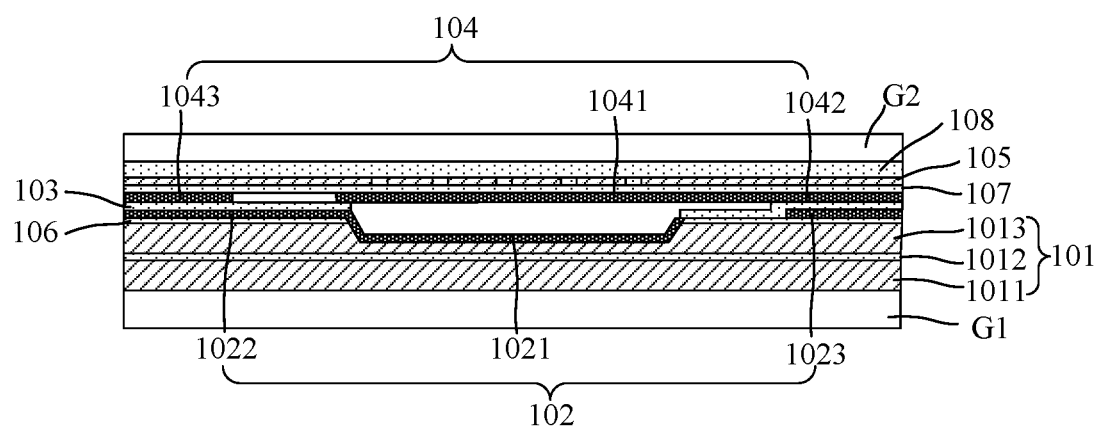
FIG. 19 is a schematic diagram of bonding the first electrode layer with the second electrode layer according to some embodiments of the present disclosure.
Figure 20:
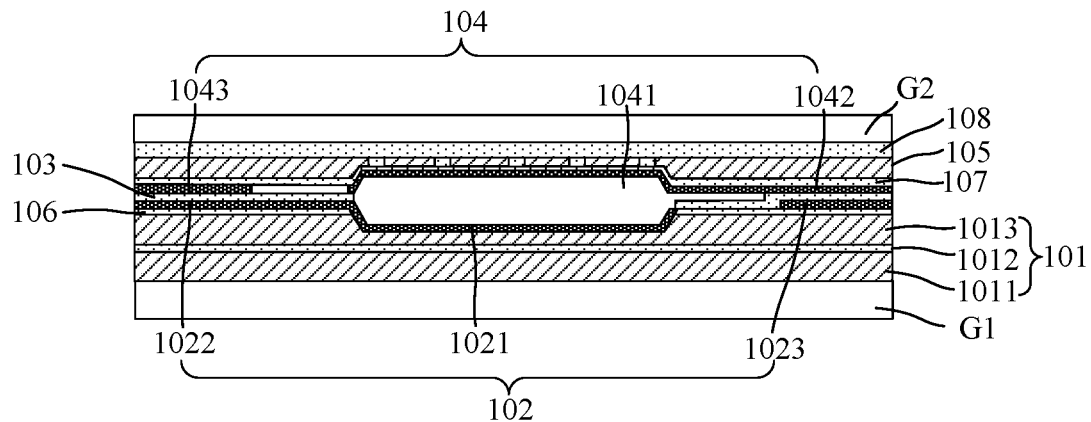
FIG. 20 is another schematic diagram of bonding the first electrode layer with the second electrode layer according to some embodiments of the present disclosure.

In the embodiments of the present disclosure, a cavity a is defined between the second electrode 1041 and the first electrode 1021 upon bonding. In FIG. 19, the cavity a is formed based on the first groove 101a. In FIG. 20, the cavity a is formed based on the first groove 101a and the second groove 105a. It should be noted that the first glass substrate G1 and the second glass substrate G2 is peeled off to form the pressure sensor in the case that the bonding is completed.

It should be noted that for the embodiments shown in FIG. 19, because the second groove 105 is not needed to be disposed on the third flexible substrate 105, the second electrode layer formed subsequently can be made flatter, such that the circuit alignment and the pattern is designed freely, and the coupling capacitance is minimized. For the embodiments shown in FIG. 20, the first groove 101a formed by the second flexible substrate 1013 and the second groove 105a formed by the third flexible substrate 105 is a half of the cavity. Because the second electrode layer is manufactured without a sacrificial layer process, it is less likely to collapse due to gravity or electrostatic forces. The solution can be fabricated directly in conjunction with an existing production line, with a simpler bonding process, a larger adjustable range of cavity heights for the cavities, and more options of range. Moreover, the surface, distal form the first flexible substrate, of the third flexible substrate of the pressure sensor is completely flattened, with less coupling capacitance, which is beneficial to the earlier simulation design. The two sides of the third flexible substrate are respectively the fifth insulative layer (inorganic material) and the third insulative layer (inorganic material), and a certain degree of elasticity is ensured based on a certain degree of stiffness recovery.

In summary, embodiments of the present disclosure provide the method for manufacturing the pressure sensor. The first flexible film layer and the second flexible film layer in the pressure sensor acquired by the method are more flexible, and the pressure sensor is more flexible and it is easy to apply the pressure sensor to a flexible product. Moreover, the flexible film layer is light, such that the risk of cavity collapse is reduced, the yield of the pressure sensor and the effect of pressure detection is ensured.

Figure 21:
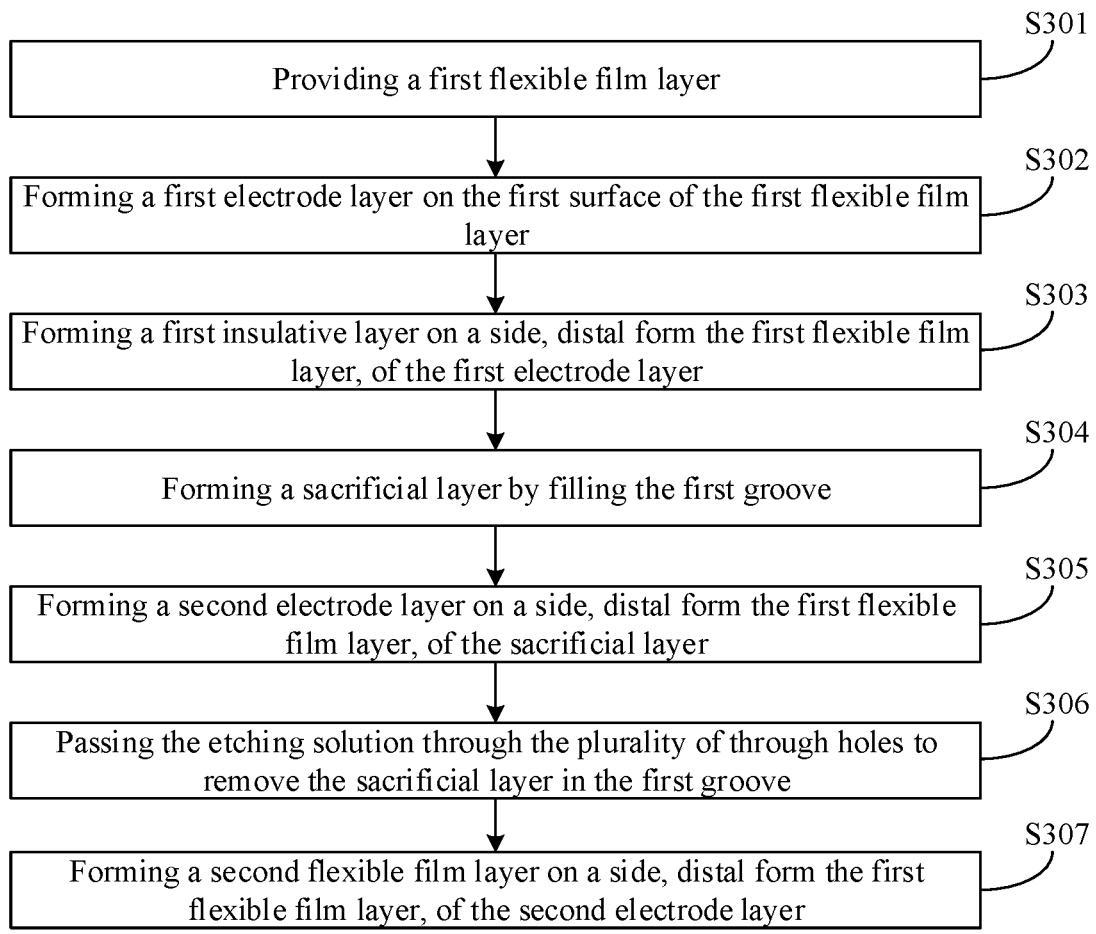
FIG. 21 is a flowchart of still another method for manufacturing a pressure sensor according to some embodiments of the present disclosure.

FIG. 21 is a flowchart of still another method for manufacturing a pressure sensor according to some embodiments of the present disclosure. Referring to FIG. 21, the method includes the following processes.

In S301, a first flexible film layer is provided.

In the embodiments of the present disclosure, the provided first flexible film layer 101 is disposed on the first glass substrate G1. A first groove 101a is disposed in the first surface of this first flexible film layer 101, and the first groove 101a is within the sensing region 10a.

In S302, a first electrode layer is formed on the first surface of the first flexible film layer.

In the embodiments of the present disclosure, the first surface of the first flexible film layer 101 is a surface, distal form the first glass substrate G1, of the first flexible film layer 101. That is, a first electrode layer 102 is formed on one side, distal form the first glass substrate G1, of the first flexible film layer 101. The first electrode layer 102 at least includes a first electrode 1021 and a first electrode lead 1022 connected to the first electrode 1021. The first electrode 1021 is disposed in a first groove 101a within the sensing region 10a, and the first electrode lead 1022 is within a non-sensing region 10b.

In S303, a first insulative layer is formed on a side, distal form the first flexible film layer, of the first electrode layer.

The first insulative layer 103 is within the non-sensing region 10b and is outside the sensing region 10a. In this way, the first electrode lead 1022 in the first electrode layer 102 within the non-sensing region 10b is insulated from the subsequently formed second electrode layer 104.

In S304, a sacrificial layer is formed by filling the first groove.

In the embodiments of the present disclosure, the sacrificial layer is higher than the surface, distal form the first glass substrate G1, of the first insulative layer 103. For example, the height of the sacrificial layer ranges from 3 μm to 4 μm.

In some other embodiments, the material of the sacrificial layer is an organic material, for example, photoresist or polyimide.

In S305, a second electrode layer is formed on a side, distal form the first flexible film layer, of the sacrificial layer.

In some embodiments of the present disclosure, the second electrode layer 104 at least includes a second electrode 1041 and a second electrode lead 1042 connected to the second electrode 1041. The second electrode 1041 is disposed on the upper side of the sacrificial layer, and the second electrode lead 1042 is disposed on the upper side of the first insulative layer 103. That is, the second electrode 1041 is within the sensing region 10a and the second electrode lead 1042 is within the non-sensing region 10b.

Alternatively, the formed second electrode 1041 has a plurality of through holes, and the plurality of through holes are configured to etch the sacrificial layer by an etching solution.

In S306, the etching solution passes through the plurality of through holes to remove the sacrificial layer in the first groove.

In the embodiments of the present disclosure, the etching solution removes the sacrificial layer formed within the first groove 101a through a plurality of through holes on the second electrode 1041, such that, upon removal of the sacrificial layer, a cavity is defined between the second electrode 1041 and the first electrode 1021 a. The cavity a is formed at least based on the first groove 101a.

In S307, a second flexible film layer is formed on a side, distal form the first flexible film layer, of the second electrode layer.

In the embodiments of the present disclosure, the second flexible film layer 105 is disposed not only on the surface of the second electrode layer 104, but also within a plurality of through holes. It should be noted that the first glass substrate G1 is peeled off to form the pressure sensor upon forming the film layers.

In summary, embodiments of the present disclosure provide the method for manufacturing the pressure sensor. The first flexible film layer and the second flexible film layer in the pressure sensor acquired by the method are more flexible, and the pressure sensor is more flexible and it is easy to apply the pressure sensor to a flexible product. Moreover, the flexible film layer is light, such that the risk of cavity collapse is reduced, the yield of the pressure sensor and the effect of pressure detection is ensured.

Figure 22:
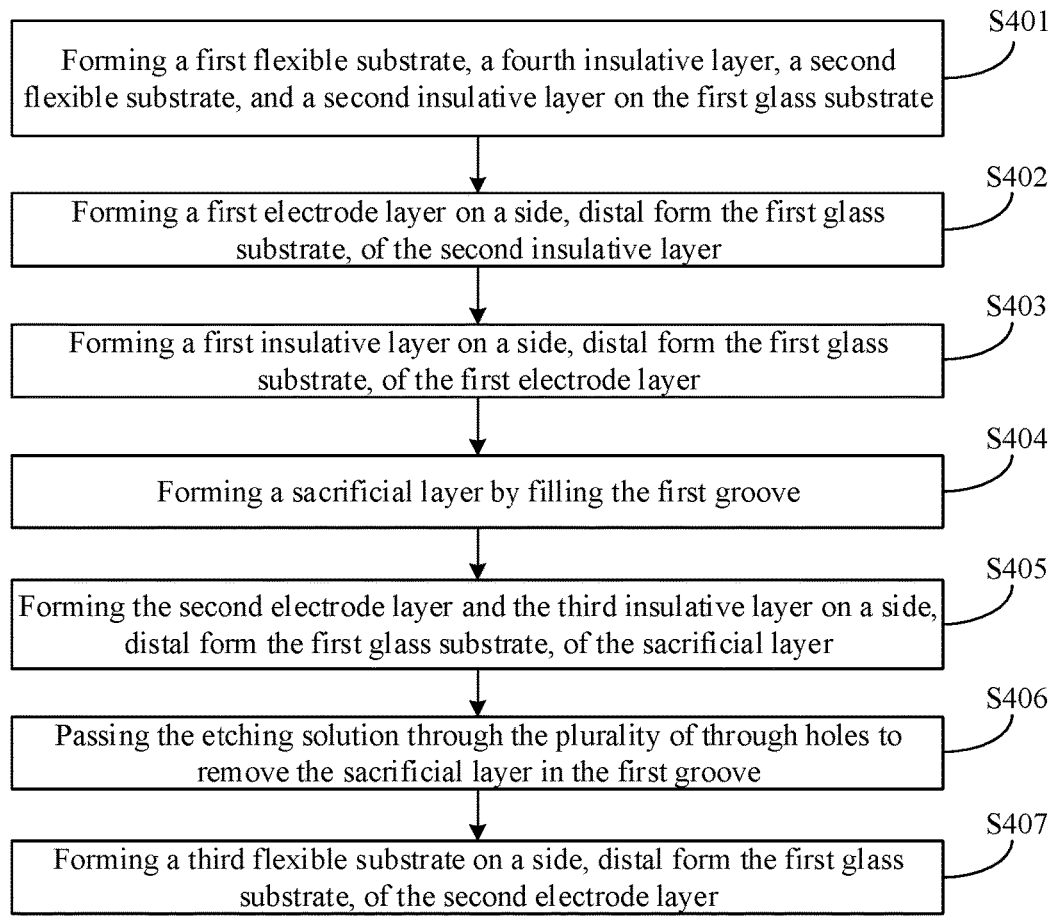
FIG. 22 is a flowchart of still another method for manufacturing a pressure sensor according to some embodiments of the present disclosure.

FIG. 22 is a flowchart of still another method for manufacturing a pressure sensor according to some embodiments of the present disclosure. Referring to FIG. 22, the method includes the following processes.

In S401, a first flexible substrate, a fourth insulative layer, a second flexible substrate, and a second insulative layer are formed on the first glass substrate.

In the embodiments of the present disclosure, referring to FIGS. 11 to 12, the process of forming the first flexible substrate 1011, the fourth insulative layer 1012, the second flexible substrate 1013, and the second insulative layer 106 on the first glass substrate G1 includes acquiring a first glass substrate G1; forming a first flexible substrate 1011 on the first glass substrate G1; forming a fourth insulative layer 1012 on a side, distal from the first glass substrate G1, of the first flexible substrate 1011; forming a second flexible film 1013a on a side, distal from the first glass substrate G1, of the fourth insulative layer 1012; forming a second insulative film 106a on a side, distal form the first glass substrate G1, of the second flexible film 1013a; acquiring the second insulative layer 106 by patterning the second insulative film 106a and the second flexible film 1013a to etch the second insulative film 106a within the sensing region 10a, and acquiring the second flexible substrate 1013 by etching the second flexible film 1013a on a surface, distal form the first glass substrate G1, of the second flexible film 1013a to form the first groove 101a.

The process of patterning includes photoresist coating, exposure of the photoresist using a mask plate, developing, and etching.

In S402, a first electrode layer is formed on a side, distal form the first glass substrate, of the second insulative layer.

In the embodiments of the present disclosure, the forming process of the first electrode layer 102 includes forming a first electrode film on the side, distal form the first glass substrate G1, of the second insulative layer 106, and acquiring the first electrode layer 102 by patterning the first electrode film.

Referring to FIG. 13, the first electrode layer 102 at least includes a first electrode 1021 and a first electrode lead 1022 connected to the first electrode 1021. The first electrode 1021 is disposed in a first groove 101a within the sensing region 10a, and the first electrode lead 1022 is within a non-sensing region 10b. The first electrode layer 102 further includes a first signal line 1023, configured to transmit other signals.

In S403, a first insulative layer is formed on a side, distal form the first glass substrate, of the first electrode layer.

The process of forming the first insulative layer 103 includes forming a first insulative film 103a on the side, distal form the first glass substrate G1, of the first electrode layer 102; and acquiring the first insulative layer 103 by patterning the first insulative film 103a. Referring to FIG. 14, the first insulative layer 103 is within the non-sensing region 10b and is outside the sensing region 10a. In this way, the first electrode lead 1022 of the electrode layer 102 within the non-sensing region 10b is insulated from the subsequently bonded second electrode layer 104.

In S404, a sacrificial layer is formed by filling the first groove.

Figure 23:
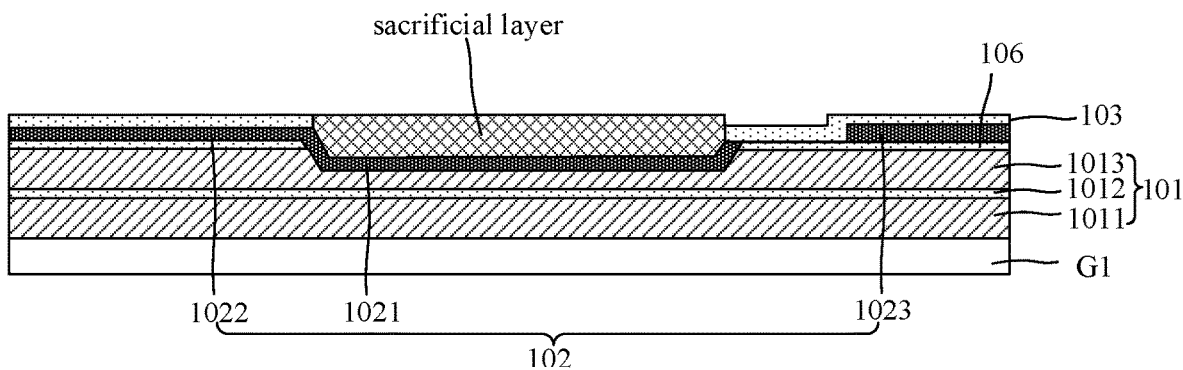
FIG. 23 is a schematic diagram of a sacrificial layer filled in a first groove according to some embodiments of the present disclosure.

In some embodiments of the present disclosure, referring to FIG. 23, the sacrificial layer is higher than the surface, distal form the first glass substrate G1, of the first insulative layer 103. Alternatively, the surface, distal form the first glass substrate G1, of the sacrificial layer is flush with the surface of the first insulative layer 103. For example, the height of the sacrificial layer ranges from 3 μm to 4 μm.

In some other embodiments, the material of the sacrificial layer is an organic material, for example, photoresist or polyimide.

In S405, the second electrode layer and the third insulative layer are formed on a side, distal form the first glass substrate, of the sacrificial layer.

In some embodiments of the present disclosure, the forming process of the second electrode layer 104 and the third insulative layer 107 includes forming a second electrode film on the side, distal form the first glass substrate G1, of the sacrificial layer; forming a third insulative film on the side, distal form the first glass substrate G1, of the second electrode film; and acquiring the second electrode layer 104p by patterning the second electrode film and the third insulative film.

Figure 24:
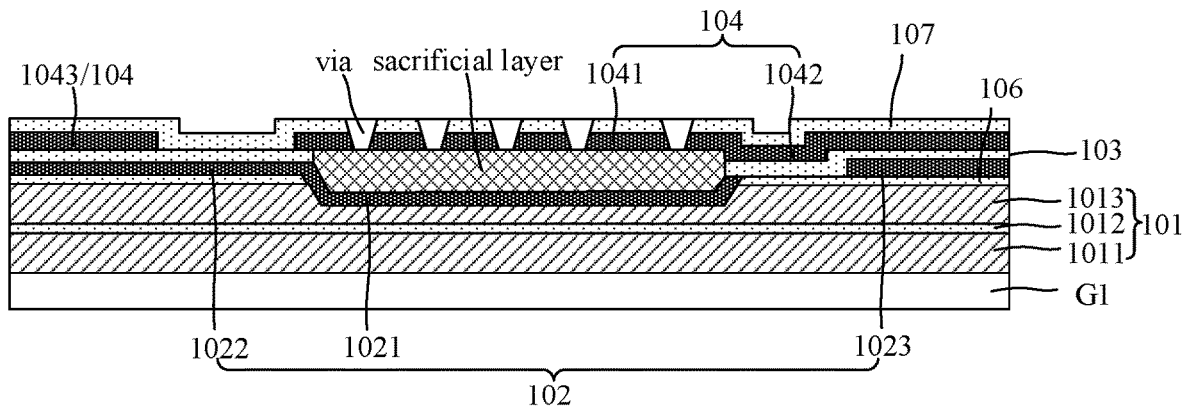
FIG. 24 is a schematic diagram of forming a second electrode layer and a third insulative layer according to some embodiments of the present disclosure.

Referring to FIG. 24, the second electrode layer 104 at least includes a second electrode 1041 and a second electrode lead 1042 connected to the second electrode 1041. The second electrode 1041 is within the sensing region 10a, and the first electrode lead 1022 is within the non-sensing region 10b.

The formed second electrode 1041 and the third insulative layer 107 have a plurality of through holes. The through holes are configured to etch the sacrificial layer by the etching solution to form a cavity a between the first electrode 1021 and the second electrode 1041. In some embodiments, an area of the orthographic projections of the plurality of through holes on the first glass substrate G1 is equal to the area of the orthographic projection of the cavity a (upon etching of the sacrificial layer, the region between the first electrode 1021 and the second electrode 1041 is the cavity a) on the first glass substrate G1 ranges from 25% to 70%.

In this way, in the case that the ratio of the area of the orthographic projections of the through holes on the first flexible film layer 101 to the area of the orthographic projection of the cavity a on the first flexible film layer 101 is too small, the sacrificial layer between the first electrode 1021 and the second electrode 1041 is not etched cleanly, resulting in the presence of the sacrificial layer residue in the cavity a, which affects the detection effect of the pressure sensor. In the case that the ratio of the area of the orthographic projections of the through holes on the first flexible film layer 101 to the area of the orthographic projection of the cavity a on the first flexible film layer 101 is too large, the second flexible film layer 105 is not sufficiently supported, and the second electrode layer 104 on the second surface, close to the first flexible film layer 101, of the second flexible film layer 105 moves in a direction approaching the first electrode layer 102 (i.e., the cavity a collapses), and the yield of the pressure sensor is lower.

In some embodiments, the shape of the through hole designed in the second electrode 1041 is circular. Alternatively, the shape of the through hole is other shapes, such as rectangular or square, etc., and is not limited in the embodiments of the present disclosure. The distance between any two adjacent through holes is greater than 10 μm. In the case that the shape of the through hole is circular, the diameter of the through hole ranges from 0.3 μm to 3 μm.

In S406, the etching solution passes through the plurality of through holes to remove the sacrificial layer in the first groove.

In some embodiments of the present disclosure, the etching solution removes the sacrificial layer formed within the first groove 101a through a plurality of through holes on the second electrode 1041, such that, upon removal of the sacrificial layer, a cavity is defined between the second electrode 1041 and the first electrode 1021 a. The cavity a is formed at least based on the first groove 101a.

In S407, a third flexible substrate is formed on a side, distal form the first glass substrate, of the second electrode layer.

Figure 25:
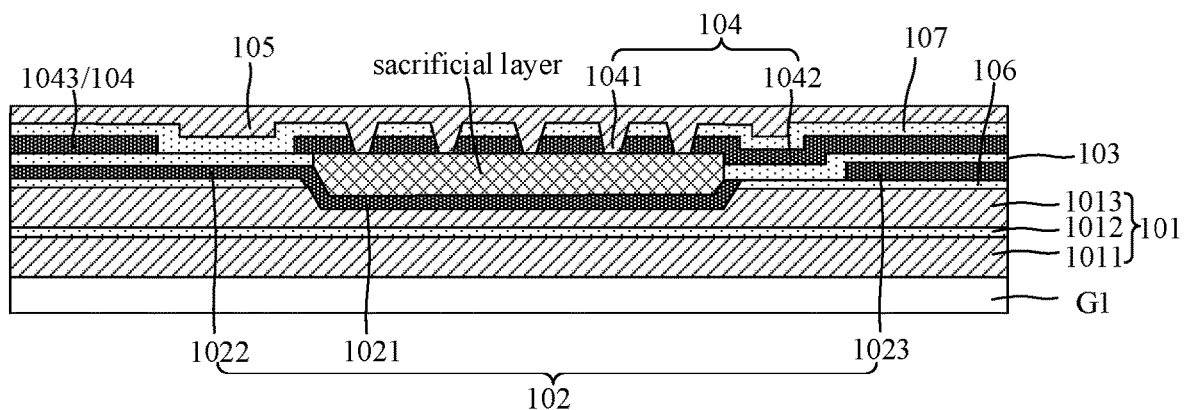
FIG. 25 is a schematic diagram of forming a third flexible substrate according to some embodiments of the present disclosure.
Figure 26:
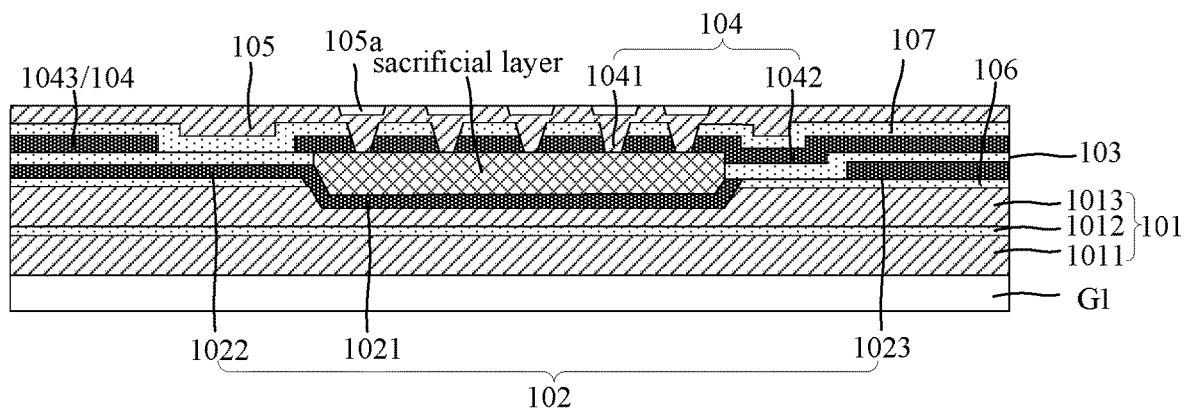
FIG. 26 is another schematic diagram of forming a third flexible substrate according to some embodiments of the present disclosure.

In the embodiments of the present disclosure, referring to FIGS. 25 and 26, the third flexible substrate 105 can be disposed not only on the surface of the second electrode layer 104, but also in the plurality of through holes. That is, the third flexible substrate 105 can be used to seal the plurality of through holes, which is a relatively simple process and easy to fabricate.

In some embodiments, the method for manufacturing the third flexible substrate 105 includes coating a third flexible film layer on the side, distal form the first glass substrate G1, of the second electrode layer 104, and the third flexible film layer is directly used as the third flexible substrate 105. That is, with reference to FIG. 25, the surface, distal form the first glass substrate G1, of the third flexible substrate 105 within the sensing region 10a is a flat surface. Alternatively, the method for manufacturing the third flexible substrate 105 includes coating a layer of the third flexible film on the side, distal form the first glass substrate G1, of the second electrode layer 104; and forming a third groove 105a and a convex structure 105b on the surface, distal form the first glass substrate G1 and within the sensing region 10a, of the third flexible film. That is, referring to FIG. 26, the third flexible substrate 105 is disposed distal form the first glass substrate G1 and within the sensing region 10a, i.e., referring to FIG. 25, the third flexible substrate 105 is disposed on a flat surface. The surface, distal form the first glass substrate G1 and disposed within the sensing region 10a, of the third flexible substrate 105 is a wave structure or a bumpy structure.

It should be noted that the first glass substrate G1 is peeled off upon forming the respective film layer to form the pressure sensor.

In summary, embodiments of the present disclosure provide the method for manufacturing the pressure sensor. The first flexible film layer and the second flexible film layer in the pressure sensor acquired by the method are more flexible, and the pressure sensor is more flexible and it is easy to apply the pressure sensor to a flexible product. Moreover, the flexible film layer is light, such that the risk of cavity collapse is reduced, the yield of the pressure sensor and the effect of pressure detection is ensured.

Embodiments of the present disclosure further provide an electronic device. The electronic device includes a first detection circuit, a second detection circuit, and a pressure sensor as described in the above embodiments. The first detection circuit is connected to a first electrode lead 1022 and a second electrode lead 1042 of the pressure sensor 10 to detect a capacitance between the first electrode 1021 connected to the first electrode lead 1022 and the second electrode 1041 connected to the second electrode lead 1042. The second detection circuit is connected to the first detection circuit to determine the pressure of the environment in which the pressure sensor is disposed based on the capacitance between the first electrode 1021 and the second electrode 1041.

In some embodiments, the electronic device is a product such as an automobile, a display device (e.g., a smartphone), and consumer electronics.

Because the electronic device has substantially the same technical effects as the pressure sensors described in the above embodiments, the technical effects of the electronic device is not repeated herein for conciseness.

It should be appreciated that although the terms first and second, etc. is used herein to describe various elements, components, regions, layers, and/or portions, these elements, components, regions, layers, and/or portions should not be limited by these terms. These terms are only used to distinguish one element, component, region, layer, or portion from another region, layer, or portion. Thus, the first element, component, region, layer, or portion discussed above is referred to as a second element, component, region, layer, or portion without departing from the teachings of the present disclosure.

Spatially relative terms such as "under," "over," "left," "right," and the spatially relative terms are used herein for ease of description to describe the relationship between one element or feature and another element or feature(s) as illustrated in the figures. It should be understood that these spatially relative terms are intended to encompass different orientations of the device in use or operation in addition to the orientation depicted in the figure. For example, in the case that the device in the figure is flipped, then a component described as "under another component or feature" is oriented as "over another component or feature". Thus, the exemplary term "under" may encompass both an orientation over and an orientation under. The device is oriented in other ways (rotated 90 degrees or in other orientations) and the spatially relative descriptors used herein are interpreted accordingly. It should also be understood that when a layer is referred to as "between two layers", it is the only layer between the two layers, or there is one or more intermediate layers.

The terminology used herein is for the purpose of describing particular embodiments only and is not intended to limit the present disclosure. As used herein, the singular forms "a," "one," and "the" are intended to include the plural form as well, unless the context clearly indicates. It should further be understood that the terms "including" and/or "including" when used in this description designate the presence of the described feature, whole, step, operation, element and/or component, but do not exclude one or more other features, wholes, steps, operations, components, parts and/or groups thereof, elements, components, parts, and/or groups thereof from existing or adding one or more other features, wholes, steps, operations, elements, parts, and/or groups thereof. As used herein, the term "and/or" includes any and all combinations of one or more of the associated listed items. In the description, specific features, structures, materials, or characteristics described is combined in any one or more embodiments or examples in a suitable manner. In addition, without contradicting each other, those skilled in the art may combine and combine different embodiments or examples and features of different embodiments or examples described in the description.

Unless otherwise defined, all terms used herein (including technical and scientific terms) have the same meaning as commonly understood by those of ordinary skill in the art to which this disclosure belongs. It should be further understood that terms such as those defined in commonly used dictionaries and the like should be construed as having a meaning consistent with their meaning in the relevant field and/or in the context of the description, and is not construed in an idealized or overly formal sense unless expressly so defined herein.

The foregoing are only optional embodiments of this application and are not intended to limit this application, and any modifications, equivalent substitutions, improvements, etc. made within the spirit and principles of this application shall be included in the scope of protection of this application.

What is claimed is:

1. A pressure sensor, having a sensing region and a non-sensing region, and comprising:
   a first flexible film layer, wherein a first groove is disposed in a first surface of the first flexible film layer, and the first groove is within the sensing region;
   a first electrode layer, wherein the first electrode layer is disposed on the first surface of the first flexible film layer, and the first electrode layer at least comprises a first electrode and a first electrode lead connected to the first electrode, wherein the first electrode is disposed in the first groove within the sensing region, and the first electrode lead is within the non-sensing region;
   a first insulative layer, disposed on a side, distal from the first flexible film layer, of the first electrode layer, wherein the first insulative layer is within the non-sensing region and outside the sensing region;
   a second electrode layer, wherein the second electrode layer is disposed on a side, distal from the first flexible film layer, of the first insulative layer, and the second electrode layer at least comprise a second electrode and a second electrode lead connected to the second electrode, wherein the second electrode is within the sensing region, a cavity is defined between the second electrode and the first electrode, the cavity is formed at least based on the first groove, and the second electrode lead is within the non-sensing region; and
   a second flexible film layer, wherein the second flexible film layer is disposed on a side, distal from the first flexible film layer, of the second electrode layer.

2. The pressure sensor according to claim 1, wherein a second groove is disposed in a second surface, close to the first flexible film layer, of the second flexible film layer, the second groove is within the sensing region;
   wherein the second electrode is disposed in the second groove within the sensing region, the cavity between the second electrode and the first electrode is formed based on the first groove and the second groove.

3. The pressure sensor according to claim 1, wherein a plurality of through holes are disposed in the second electrode, and the second flexible film layer is within the plurality of through holes.

4. The pressure sensor according to claim 3, wherein a third groove and a convex structure are disposed on a third surface, distal from the first flexible film layer, of the second flexible film layer; wherein
   an orthographic projection of the third groove on the first flexible film layer covers an orthographic projection of at least one of the through holes on the first flexible film layer; and
   an orthographic projection of the convex structure on the first flexible film layer is not overlapped with orthographic projections of the plurality of through holes on the first flexible film layer.

5. The pressure sensor according to claim 3, wherein a ratio of an area of orthographic projections of the plurality of through holes on the first flexible film layer to an area of an orthographic projection of the cavity on the first flexible film layer ranges from 25% to 70%.

6. The pressure sensor according to claim 1, further comprising a second insulative layer and a third insulative layer; wherein
   the second insulative layer is disposed between the first flexible film layer and the first electrode layer, and the second insulative layer is within the non-sensing region and outside the sensing region; and
   the third insulative layer is disposed between the second flexible film layer and the second electrode layer, and the third insulative layer is within the non-sensing region and outside the sensing region.

7. The pressure sensor according to claim 1, wherein the first flexible film layer comprises a first flexible substrate, a fourth insulative layer, and a second flexible substrate that are stacked sequentially;
   wherein the second flexible substrate is close to the first electrode layer relative to the first flexible substrate, and the first groove is disposed in a surface, distal from the first flexible substrate, of the second flexible substrate.

8. An electronic device, comprising a first detection circuit, a second detection circuit, and the pressure sensor as defined in claim 1; wherein
   the first detection circuit is connected to the first electrode lead and the second electrode lead of the pressure sensor to detect a capacitance between the first electrode connected to the first electrode lead and the second electrode connected to the second electrode lead; and
   the second detection circuit is connected to the first detection circuit to determine the pressure of an environment in which the pressure sensor is disposed based on the capacitance between the first electrode and the second electrode.

9. The electronic device according to claim 8, wherein a second groove is disposed in a second surface, close to the first flexible film layer, of the second flexible film layer, the second groove is within the sensing region;
wherein the second electrode is disposed in the second groove within the sensing region, the cavity between the second electrode and the first electrode is formed based on the first groove and the second groove.

10. The electronic device according to claim 8, wherein a plurality of through holes are disposed in the second electrode, and the second flexible film layer is within the plurality of through holes.

11. The electronic device according to claim 10, wherein a third groove and a convex structure are disposed on a third surface, distal from the first flexible film layer, of the second flexible film layer; wherein
an orthographic projection of the third groove on the first flexible film layer covers an orthographic projection of at least one of the through holes on the first flexible film layer; and
an orthographic projection of the convex structure on the first flexible film layer is not overlapped with orthographic projections of the plurality of through holes on the first flexible film layer.

12. The electronic device according to claim 10, wherein a ratio of an area of orthographic projections of the plurality of through holes on the first flexible film layer to an area of an orthographic projection of the cavity on the first flexible film layer ranges from 25% to 70%.

13. The electronic device according to claim 8, wherein the pressure sensor further comprises a second insulative layer and a third insulative layer; wherein
the second insulative layer is disposed between the first flexible film layer and the first electrode layer, and the second insulative layer is within the non-sensing region and outside the sensing region; and
the third insulative layer is disposed between the second flexible film layer and the second electrode layer, and the third insulative layer is within the non-sensing region and outside the sensing region.

14. A method for manufacturing a pressure sensor, wherein the pressure sensor has a sensing region and a non-sensing region, and the method comprises:
providing a first flexible film layer, wherein a first groove is disposed in a first surface of the first flexible film layer, and the first groove is within the sensing region;
forming a first electrode layer on the first surface of the first flexible film layer, wherein the first electrode layer at least comprises a first electrode and a first electrode lead connected to the first electrode, wherein the first electrode is disposed in the first groove within the sensing region, and the first electrode lead is within the non-sensing region;
forming a first insulative layer on a side, distal from the first flexible film layer, of the first electrode layer, wherein the first insulative layer is within the non-sensing region and outside the sensing region;
providing a second flexible film layer;
forming a second electrode layer on a second surface of the second flexible film layer, wherein the second electrode layer at least comprises a second electrode and a second electrode lead connected to the second electrode, wherein the second electrode is within the sensing region, and the second electrode lead is within the non-sensing region; and
bonding the second electrode layer with the first electrode layer by a bonding process, wherein a cavity is defined between the second electrodes and the first electrodes upon bonding, and the cavity is formed at least based on the first groove.

15. The method according to claim 14, wherein a second groove is disposed in the second surface of the second flexible film layer, and the second groove is within the sensing region; and forming the second electrode layer on the second surface of the second flexible film layer comprises:
forming the second electrode of the second electrode layer in the second groove in the second surface and forming the second electrode lead of the second electrode layer outside the second groove on the second surface;
wherein a cavity between the second electrode and the first electrode is formed based on the first groove and the second groove.

16. The method according to claim 14, further comprising a second insulative layer and a third insulative layer; wherein
the second insulative layer is disposed between a first flexible film layer and the first electrode layer, and the second insulative layer is within the non-sensing region and outside the sensing region;
the third insulative layer is disposed between the second flexible film layer and the second electrode layer, and the third insulative layer is within the non-sensing region and outside the sensing region.

17. The method according to claim 14, wherein providing the first flexible film layer comprises:
sequentially forming a first flexible substrate, a fourth insulative layer, and a second flexible substrate;
wherein the second flexible substrate is close to the first electrode layer relative to the first flexible substrate, and the first groove is disposed in a surface, distal from the first flexible substrate, of the second flexible substrate.

18. A method for manufacturing a pressure sensor, wherein the pressure sensor has a sensing region and a non-sensing region, and the method comprises:
providing a first flexible film layer, wherein a first groove is disposed in a first surface of the first flexible film layer, and the first groove is within the sensing region;
forming a first electrode layer on the first surface of the first flexible film layer, wherein the first electrode layer at least comprises a first electrode and a first electrode lead connected to the first electrode, the first electrode is disposed in the first groove within the sensing region, and the first electrode lead is within the non-sensing region;
forming a first insulative layer on a side, distal from the first flexible film layer, of the first electrode layer, wherein the first insulative layer is within the non-sensing region and outside the sensing region;
forming a sacrificial layer by filling in the first groove;
forming a second electrode layer on a side, distal from the first flexible film layer, of the sacrificial layer, wherein the second electrode layer at least comprises a second electrode and a second electrode lead connected to the second electrode, wherein the second electrode is within the sensing region, and a plurality of through holes are disposed in the second electrode, and the second electrode lead is within the non-sensing region;

removing the sacrificial layer in the first groove through the plurality of through holes by an etching solution, and upon removal of the sacrificial layer, a cavity is defined between the second electrode and the first electrode, and the cavity is formed at least based on the first groove; and forming a second flexible film layer on a side, distal from the first flexible film layer, of the second electrode layer, wherein the second flexible film layer is within the plurality of through holes.

19. The method according to claim 18, wherein a third groove and a convex structure are disposed on a third surface, distal from the first flexible film layer, of the second flexible film layer; wherein an orthographic projection of the third groove on the first flexible film layer covers an orthographic projection of at least one of the through holes on the first flexible film layer; and an orthographic projection of the convex structure on the first flexible film layer is not overlapped with orthographic projections of the plurality of through holes on the first flexible film layer.

20. The method according to claim 18, wherein a ratio of an area of orthographic projections of the plurality of through holes on the first flexible film layer to an area of an orthographic projection of the cavity on the first flexible film layer ranges from 25% to 70%.

* * * * *